Figure 1:
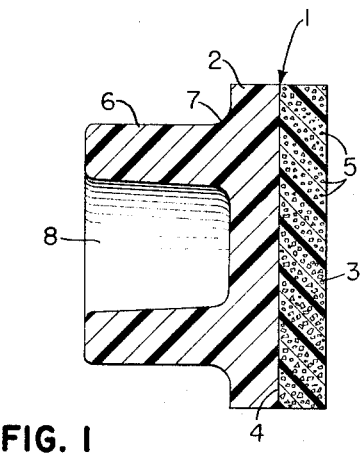

Aug. 9, 1966

H. N. YAZELL, JR  3,265,167
INTEGRAL MOLDED PISTON AND LINING FOR
BRAKES AND METHOD FOR FORMING THEREOF
Filed July 10, 1964

INVENTOR.
HAROLD N. YAZELL, JR.
BY
J. B. Holden
ATTORNEY

United States Patent Office 3,265,167
Patented August 9, 1966

3,265,167
INTEGRAL MOLDED PISTON AND LINING FOR BRAKES AND METHOD FOR FORMING THEREOF
Harold N. Yazell, Jr., Cuyahoga Falls, Ohio, assignor to The Goodyear Tire & Rubber Company, Akron, Ohio, a corporation of Ohio
Filed July 10, 1964, Ser. No. 381,827
9 Claims. (Cl. 188—251)

This invention relates to a unitary or integral molded piston and lining for brakes and a method for forming thereof, which unit is particularly adaptable for use in disc type brakes, or fixed ring type brakes wherein the piston applying pressure to the brake lining is directly in contact with the brake lining.

Heretofore it has been known that the use of disc type and fixed ring type brakes has provided an improvement in the art where these brakes have been particularly adaptable for airplane and other high performance usage where a high braking force for a small applied pressure is desired. These brakes utilize a piston engaging a brake lining and where the piston directly applies force to the brake lining against the moving part desired to be braked. Conventionally, these brake linings are held in place on the piston by screws or other means so that they may be readily replaced. However, this arrangement requires use of a relatively expensive piston, and the plurality of parts in the brake require a greater stockpiling of parts to handle repair and replacement problems.

It is the general object of the present invention to avoid and overcome the foregoing and other difficulties of prior art practices by the provisions of an integral piston and brake lining which can be formed in a single molding operation for an extremely low cost, and which will be durable, high effective and of uniform and precise dimensions.

Another object of the invention is to provide an integral piston and brake lining which can be molded in a single piece mold and removed longitudinally therefrom since the piston is formed of a uniform circumferential shape with a reduced diameter on one end thereof adapted to receive an O-sealing ring in a fluid tight relationship therewith.

A further object of the invention is to provide a method for forming an integral piston and brake lining wherein both the piston and brake lining are separately formed from resin based materials including a common heat curable thermosetting epoxy resin bonding agent so that when the preformed articles are placed adjacent to each other and subjected to pressure and heat a thorough intermixing of the bonding agents between the interfaces occurs to provide a unitary or integral article therefrom by a single molding operation.

Another object of the invention is to provide a method for forming an integral piston and brake lining utilizing a single molding operation which provides the integral piston and braking lining at very low cost but of high quality precision in the dimensions thereof.

The aforesaid objects of the invention and other objects which will become apparent as the description proceeds are achieved by providing an integrally molded piston and lining for brakes which includes the combination of a cylindrically shaped piston made from a heat cured thermosetting epoxy resin bonding agent which piston has a reduced diameter portion at one end thereof, and a friction disc made from a heat cured thermosetting epoxy resin bonding agent and including small particles of hard abrasive material randomly distributed therethrough which disc is fused by heat and pressure to the other end of the piston so that the common epoxy resin bonding agent in the piston and the friction disc completely intermix.

The process of the invention for forming an integral piston and lining for brakes comprises the steps of forming the piston of a heat curable thermosetting epoxy resin bonding agent into a cylindrical shape having a reduced diameter portion on one end thereof, forming the brake lining from a heat curable thermosetting epoxy resin bonding agent which includes small particles of hard abrasive materials randomly distributed therethrough, fusing the lining to the other end of the piston by applying heat and pressure so that the piston and lining become substantially of fluid consistency to allow an intermixing of the common bonding agent, and effecting a heat cure of the common bonding agent.

Figure 2:
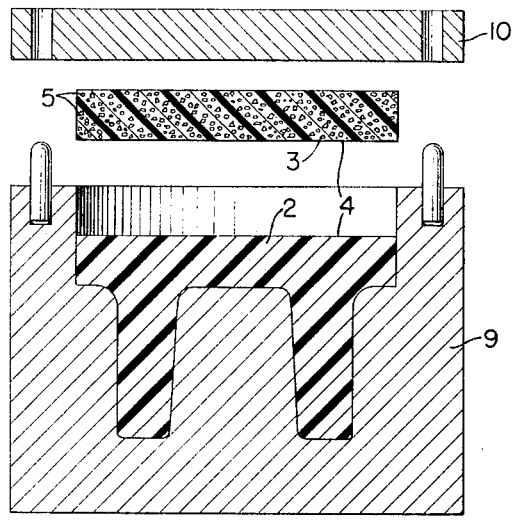
Figure 3:
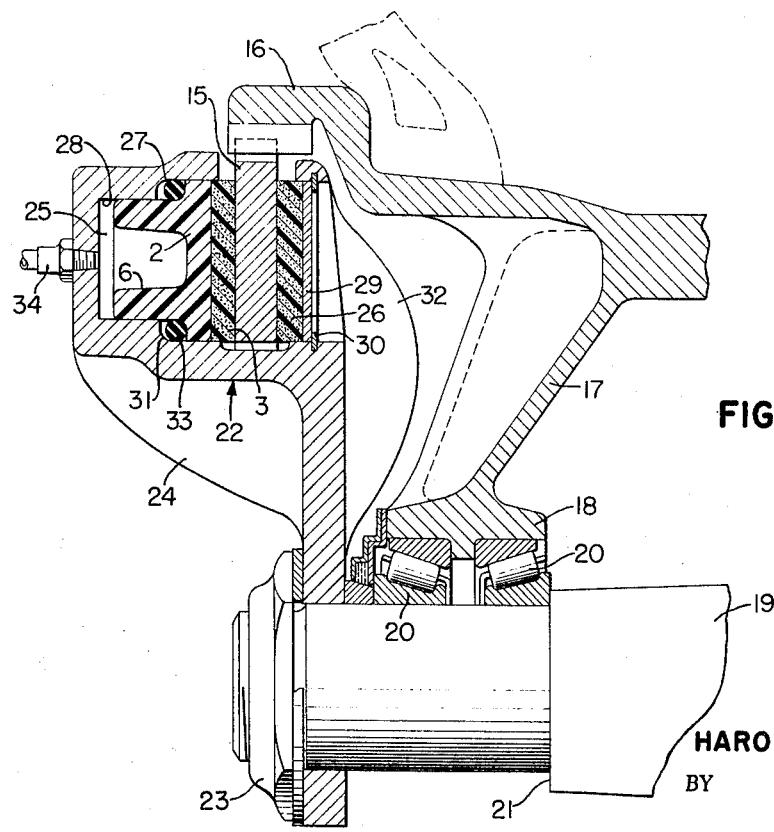

For a better understanding of the invention reference should be had to the accompanying drawings, wherein:

FIGURE 1 is a vertical cross sectional elevation of the integral piston and lining formed by a single molding step and comprising one embodiment of the invention;

FIGURE 2 is an exploded view of the piston and lining of FIGURE 1 with the piston placed into a mold and the lining in exploded relation thereto showing how the piston and lining are formed by a single molding step, which formed unit can be withdrawn longitudinally from the mold; and FIGURE 3 is a broken away vertical cross sectional view of the piston and lining operatively positioned in relation to a disc brake on a wheel and showing the relationship of the piston and lining to the rotating disc and to the supporting structure.

While the integral piston and lining of the invention may be adaptable to any type of brake, it is believed most practical for a spot type, single disc brake wherein the disc is splined to the wheel of a vehicle, and hence it has been so illustrated and will be so described.

With reference to FIGURE 1 of the drawings, the numeral 1 indicates generally an integral piston and lining for a brake composed of a piston 2 and a friction disc 3, both of which are substantially of conventional shape. In other words, the piston 2 is substantially of cylindrical shape while the disc 3 is of substantially the same shape and is adapted to be secured to the piston. In essence, the disc 3 is secured to the piston 2 in a laminated construction by an interfusing or intermixing at the adjacent abutted surfaces or interfaces 4 of the assembled abutted articles by means of heat and pressure, as will be more fully described hereinafter. The disc 3 contains a plurality of small abrasive particles 5 which are randomly dispersed therethrough and which are controlled in size and number, or quantity according to the desired friction coefficient for the disc 3.

As a feature of the invention, the bottom, or skirt end of the piston 2 is preferably formed of a uniform reduced diameter at 6 with a gently curved fillet 7 between the reduced diameter 6 and the inner section of the piston 2. One purpose of the reduced diameter 6 is to allow molding of the piston and lining 1 in a one-piece mold, as will be more fully described with reference to FIGURE 2.

Most pistons contain a recessed portion adaptable to receive an endless O-ring, generally made of rubber, to provide a seal for the piston in a support cylinder. A sealing O-ring (not shown in FIGURE 1) is adapted to be received over the reduced diameter portion 6 and fit during some portions of the operation of the brake against the fillet 7 while extending slightly beyond the outer diameter of the piston 2 so as to insure a positive seal between the piston and a cylinder. A recessed portion 8 is cut out from the center of the reduced diameter portion 6 in order to lighten the weight of the piston, while still maintaining its strength, and also to facilitate the heat curing process during the molding thereof, as set forth below, by making the cross sectional area of the piston substantially uniform at any particular point.

The invention contemplates that the piston 2 and the friction disc 3 both are made from a material comprised of a heat curable thermosetting epoxy resin bonding agent mixed with asbestos powder to give heat resistant properties. The abrasive particles 5 in the disc 3 may include iron powder, brass chips, or other suitable abrasive particles. Graphite may also be added to the disc 3, as utilized in conventional braking linings.

The method for forming the integral piston and lining 1 of FIGURE 1 is most clearly illustrated with reference to FIGURE 2 wherein a single piece mold 9 has a cavity formed therein to the exact internal dimensions of the piston 2 and the disc 3. The epoxy resin bonding agent and asbestos powder comprising the piston 2 can be provided in a thick fluid state prior to the heat curing and/or the curing of the resin by the action of a catalyst. While in the pre-cured liquid state, it may be poured into the mold 9 to approximately the level indicated in FIGURE 2, which is the desired size for the piston shown in FIGURE 1. The disc 3 is pre-formed, usually but not necessarily to include the abrasive particles 5, to the shape shown in FIGURE 2 and is partially solidified and/or cured. The disc 3 is now placed on top of the uncured thick liquid provided to form the piston 2.

A top 10 is mounted on the mold 9 and is adapted to be clamped over the top of the disc 3 and provide a fluid tight seal over the cavity of the mold 9. The disc 3 is formed to extend slightly above the top level of the mold 9 so that when the top 10 is clamped into sealing position it exerts downward pressure on the disc 3 forcing it solidly against the liquid in the mold thereby creating a pressure on the adjacent interfaced layers which assists in the intermixing thereof and increases the strength of the resultant lamination. Heat is then applied to raise the temperature of the masses provided to form the disc 3 and the piston 2 above the curing temperature for the thermosetting epoxy resin to complete the intermixing and bonding between the adjacent interfaces and ultimately a hardening or curing of the assembly. Since the bonding agents in the piston 2 and the disc 3 are both the same thermosetting epoxy resin, a complete intermixing between the adjacent faces will result as the faces become more liquid under the heat, so that when hardening is resultant from the heat curing action, a complete and integral laminate between the disc 3 and the piston 2 is achieved.

Although the invention is most adaptable to a heat curable resin base, any suitable base could be utilized which will provide an intermixing of the laminated interfaces under pressure and/or heat. In other words other suitable resins could be utilized which could be cured by a catalyst alone or under the effect of pressure.

The advantage of being able to integrally mold the piston 2 and the disc 3 is that the usual metal casting and machining operations are eliminated, as are means to secure the lining to the piston, and a final product having high precision dimensions results. In fact, the final product is of higher quality and closer, or more accurate dimensions than are possible by machine lathe operation.

Further, a mass production of this type of molded piston and brake lining utilizing the thermosetting epoxy resin bonding agent results in a decrease in the cost of manufacture while reducing the number of pieces in the brake itself thereby lessening stock and replacement problems. A molding operation of this type provides extremely smooth outer surfaces, particularly on the reduced diameter portion 6 so that a secure fluid tight seal can be provided by a rubber O-ring. The amount of heat curing necessary will depend upon the particular epoxy-resin bonding agent utilized, but it has been found that a complete and thorough intermixing between the adjacent faces of the disc 3 and the piston 2 is obtained by the pressure applied thereto by the mold and by the heat curing process. The abrasive particles 5 in the disc 3 will remain essentially in their initial random relationship during the heat curing process.

For an understanding of how the piston and lining 1 of FIGURE 1 are used, reference should be had to FIGURE 3 wherein the numeral 15 indicates generally a rotary brake member, this taking the form of a radially thick endless metal disc splined around its circumference to a wheel 16 adapted to mount a pneumatic tire. The wheel 16 includes integral flanges 17 connecting to a central hub 18 which is rotatably mounted on an axle 19 by bearings 20. The hub 18 and bearings 20 are fixed in axial relation on the axle 19 by a shoulder 21 which may be integrally formed with the axle 19, or operatively secured thereto. The fixed part of the brake assembly includes a one-pieced, forked, or caliper-shaped brake housing 22 which is operatively mounted on the axle 19 and secured in place thereon by a nut 23. The housing 22 straddles the disc 15 from the inner periphery as shown. Generally, the housing 22 is splined in fixed relation with the axle 19 to better resist the brake torque. Webs 24 are provided as an integral part of the housing 22 for strengthening purposes.

The housing 22 provides a piston chamber 25 adapted to receive the integrally molded piston and brake lining 1, such as illustrated in FIGURE 1. The piston chamber 25 is formed with a greater diameter portion 27 and a lesser diameter portion 28 adapted to slidably engage the two diameters of the piston 2. A greater clearance may be sometimes provided between the piston skirt 6 and the diameter 28. The larger diameter 27 also slidably engages and supports the lining 3. Note that a fillet 31 is provided between the greater diameter portion 27 and the lesser diameter portion 28 of the chamber 25, and that this fillet 31 in combination with a fillet 7 on the piston contains an endless rubber O-ring 33. Fluid pressure is supplied against the piston 1 through an access opening 34 in the housing 22. Conventional means (not shown) control the pressure fluid supply.

Thus, the utilization of the greater diameter portion 27 and the lesser diameter portion 28 of the chamber 25 in conjunction with the two diameter piston serves to automatically hold the O-ring 33 in position without any retaining flange on the skirt 6 of the piston. Thus, the piston 2 and lining 3 can be integrally molded in a one piece mold operation.

In order to provide a balanced opposed force against the splined disc 15, a friction or lining button 26 is operatively mounted on the opposite side thereof. The lining 26 is preferably mounted in a continuation of the larger diameter bore 27 of the chamber 25 which simplifies machining operations and which allows the piston 1 to be introduced into the chamber 25 through this opening. The lining 26 is normally carried on a metal back plate 29 and is held removably in place by a snap-in lock ring 30. An integral strengthening webbing 32 is usually provided to add greater strength to the housing 22. The splined connection of the disc 15 to the wheel 16 allows the disc 15 to float in a lateral direction thereby insuring an equal and positive clamping on both sides thereof by the lining 26 and the piston lining 3 when pressure is applied behind the piston through the opening 34.

When linings are to be replaced the nut 23 is removed to allow the housing 22 and the disc 15 to be removed. Lock ring 30 is taken out and lining 26 discarded. Piston and lining assembly 1 is now slid out of chamber 25 and an entirely new piston and lining assembly is introduced, a new lining 26 is provided and the snap ring 30 is put back in place. The housing is now stabbed over the inner periphery of the disc with the linings on either side thereof. The disc 15 and housing 22 are now slid back onto the wheel 16 and axle 19, respectively, and the nut 23 replaced.

Thus, the objects of the invention are achieved. The integral piston and lining assembly 1 is so inexpensive that the entire unit can be replaced. The number of replacement parts is reduced, and relining is simplified. The housing is also of a one-piece simplified construction.

While in accordance with the patent statutes only one best known embodiment of the invention has been illustrated and described in detail, it is to be particularly understood that the invention is not limited thereto or thereby, but that the inventive scope is defined by the appended claims.

What is claimed is:

1. In an integrally molded piston and lining for brakes the combination of
    a cylindrically shaped piston made from a heat cured thermosetting epoxy resin bonding agent mixed with asbestos powder, said piston having a reduced diameter portion at one end thereof to provide a sealing surface and a recessed portion inside the reduced diameter portion to eliminate weight, and to provide substantially uniform cross sectional areas in the piston, and
    a friction disc made from a heat cured thermosetting epoxy resin bonding agent mixed with asbestos powder and including iron powder, brass chips and graphite to provide a friction surface, said friction disc being fused by heated and pressure to the other end of said piston by the common epoxy resin bonding agent in the piston and the friction disc.

2. An integrally molded piston and lining for brakes according to claim 1 where the friction disc is laminated to the other end of the piston by a thorough intermixing of the common epoxy resin bonding agent in the adjacent interface layers before complete curing thereof.

3. An integrally molded plastic piston and lining for use with a spot pressure type brake including a cylindrically-shaped axially-short lining compounded of lining-forming materials and held together with a plastic binder, a piston having the same diameter as the lining and of cylindrical, axially short shape, an integral skirt on the piston of a reduced diameter but a greater axial length, said piston and skirt being compounded of heat resistant materials and held together with the same plastic binder as the lining, the head of the piston and one side of the lining abutting and being integrally fused together over their areas of abutment.

4. In an integrally molded piston and lining for brakes the combination of
    a cylindrically shaped piston made from a heat curable resin bonding agent with insulation and reinforcing means therein, said piston having a reduced diameter portion at one end thereof to provide a sealing surface, and
    a partially preformed friction disc made from a curable thermosetting epoxy resin bonding agent and including hard abrasive material to provide a friction surface, said friction disc being laminated under pressure to the other end of said piston resulting in a thorough mixing at the adjacent interfaces of the common epoxy resin bonding agent in the piston and the friction disc as the bonding agent is cured.

5. A process for forming an integrally molded piston and lining for brakes which comprises the steps of
    forming a piston of a heat curable thermosetting epoxy resin bonding agent mixed with asbestos powder into a cylindrical shape having a reduced diameter portion on one end thereof,
    forming a brake lining of a heat curable thermosetting epoxy resin bonding agent mixed with asbestos powder and including small particles of hard abrasive material randomly distributed therethrough into a cylindrical shape of substantially the same size as the other end of the piston, and
    fusing the brake lining to the other end of the piston by applying heat and pressure so that the piston and brake lining become substantially of fluid consistency to allow an intermixing of the common bonding agent before the final heat cure.

6. A process for forming an integrally molded piston and lining for brakes which comprises the steps of
    forming an epoxy resin bonding agent into a first cylindrical shape having a reduced diameter portion on one end thereof,
    forming an epoxy resin bonding agent including small particles of hard abrasive material randomly distributed therethrough into a second cylindrical shape of substantially the same size as said first cylindrical shape, and
    fusing the second cylindrical shape to the other end of the first cylindrical shape by applying heat and pressure so that the adjacent interfaces become substantially of fluid consistency to allow an intermixing of the common bonding agent before the final cure.

7. A process for forming an integrally molded piston and lining for brakes which comprises the steps of
    forming a piston of a heat curable thermosetting epoxy resin bonding agent into a cylindrical shape having a sealing portion on one end thereof,
    forming a brake lining of a heat curable thermosetting epoxy resin bonding agent including particles of hard abrasive material randomly distributed therethrough into a cylindrical shape of substantially the same size as the other end of the piston, and
    laminating the lining to the other end of the piston by applying heat and pressure so that the piston and lining become substantially of fluid consistency to allow an intermixing of the common epoxy resin bonding agent before the final heat cure.

8. A process for forming an integrally molded piston and lining for brakes which comprises the steps of
    pouring a curable resin bonding agent in liquid form mixed with a heat resistive and reinforcing agent into a one-piece molded having an internal shape like a cylinder having a reduced diameter sealing portion on one end thereof,
    placing a preformed brake disc of a curable resin bonding agent mixed with a heat resistive and insulative agent on top of the liquid resin in the mold, and
    laminating the disc to the liquid resin by applying heat and pressure so that adjacent interfaces become substantially of fluid consistency to allow an intermixing of the common resin bonding agent before the resin is finally cured.

9. That method of making an integral piston and lining and in which the piston has a reduced diameter skirt and for use with a spot pressure type brake which includes the steps of pouring the skirt of the piston with a liquid plastic, continuing the pouring to form the piston, applying a preformed, only partially cured, plug of lining having a binder of the same liquid plastic to the head of the piston while the piston and skirt are still liquid and applying heat and pressure to the skirt, piston and lining to cure the assembly into an integral unit.

References Cited by the Examiner

UNITED STATES PATENTS

| | | | |
|---|---|---|---|
| 2,191,703 | 2/1940 | Anderson | 264—279 |
| 2,406,653 | 8/1946 | Batchelor. | |
| 2,801,714 | 8/1957 | Dotto | 188—152 |
| 2,901,852 | 9/1959 | Hall | 264—279 |
| 3,052,326 | 9/1962 | Baisch | 188—73 |
| 3,090,468 | 5/1963 | Rucker | 188—73 |

FOREIGN PATENTS 614,633  2/1961  Canada.

ROBERT F. WHITE, *Primary Examiner.*

MILTON BUCHLER, *Examiner.*

G. E. A. HALVOSA, T. J. CARVIS, *Assistant Examiners.*